UNITED STATES PATENT OFFICE.

RUDOLPH BERENDES, OF ELBERFELD, GERMANY, ASSIGNOR TO FARBENFABRIKEN VORM. FRIEDR. BAYER & CO., OF ELBERFELD, GERMANY, A CORPORATION OF GERMANY.

PHENYL ESTERS OF ALPHA-IODOISOVALERIC ACID.

994,494.  Specification of Letters Patent. Patented June 6, 1911.

No Drawing.  Application filed December 6, 1910. Serial No. 595,879.

*To all whom it may concern:*

Be it known that I, RUDOLPH BERENDES, doctor of philosophy, chemist, citizen of the German Empire, residing at Elberfeld, Kingdom of Prussia, Germany, have invented new and useful Improvements in New Pharmaceutical Products, being Phenyl Esters of Alpha-Iodoisovaleric Acid, of which the following is a specification.

My invention relates to the manufacture and production of new and valuable pharmaceutical products which are chemically phenyl esters of alpha-iodoisovaleric acid of the general formula:

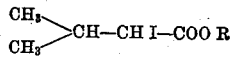

R meaning a phenol, such as phenol, thymol, guaiacol, creosote (a mixture consisting mainly of creosol and guaiacol), hydroquinone, etc.

According to my researches the new products possess valuable therapeutic properties, especially for treatment of tuberculosis, and the absence of any odor, their freedom from irritation, non-toxicity, and ability of being easily reabsorbed render their inward application highly satisfactory, an average single dose being about one gram.

The process for producing the new compounds consists in treating phenols with alpha-iodoisovaleric acid or its derivatives.

The new compounds are oils or solids soluble in alcohol and chloroform. When reacted upon by dilute caustic alkalis they are split up into phenol and alpha-oxyisovaleric acid.

In carrying out my process practically I can proceed as follows, the parts being by weight:—200 parts of alpha-bromoisovaleric chlorid obtained by treating alpha-isovaleric chlorid with bromin are dissolved in 200 parts of benzene and 100 parts of pyridin and 124 parts of guaiacol are added. After some time the alpha-bromoisovalerylguaiacol is filtered off. It crystallizes from alcohol in the shape of crystals melting at 69–70° C. 287 parts of this ester are mixed with 300 parts of alcohol and the mixture is then heated to about 50–80° with 175 parts of potassium iodid (KI). The reaction is complete after 4 hours. The new ester of the formula:

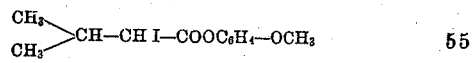

is filtered off, washed with water and recrystallized from alcohol. It crystallizes in the shape of colorless crystals melting at 76–79° C. They are soluble in hot alcohol, benzene and chloroform and liberate guaiacol and alpha-oxyisovaleric acid when reacted upon by dilute caustic alkali.

The ester of creosote (a mixture consisting mainly of creosole and guaiacol) is a thick oil from which crystals separate while standing. The thymol ester is a thick oil boiling at about 200° C. under a pressure of 20 mm.

I claim:—

1. The herein described new phenyl esters of alpha-iodoisovaleric acid, being soluble in alcohol and chloroform, liberating the phenol and alpha-oxyisovaleric acid when reacted upon by dilute caustic alkalis and exhibiting valuable therapeutic properties, substantially as described.

2. The herein described new guaiacol ester of alpha-iodoisovaleric acid, which crystallizes from alcohol in the shape of crystals melting at 76–79° C. soluble in alcohol, benzene and chloroform, liberating alpha-oxyisovaleric acid and guaiacol when reacted upon by dilute caustic alkali; and exhibiting valuable therapeutic properties, substantially as described.

In testimony whereof I have hereunto set my hand in the presence of two subscribing witnesses.

RUDOLPH BERENDES. [L. S.]

Witnesses:
 ALFRED HENKEL,
 WALTER VONNEGUT.